No. 745,889. PATENTED DEC. 1, 1903.
C. E. McPHERSON.
WATER COOLER AND FILTER.
APPLICATION FILED JUNE 17, 1903.
NO MODEL.

Witnesses:

Inventor,
C. E. McPherson,
By H. C. Evert & Co.
Attorneys.

THE NORRIS PETERS CO., PHOTO-LITHO., WASHINGTON, D. C.

No. 745,889. Patented December 1, 1903.

UNITED STATES PATENT OFFICE.

CHARLES E. McPHERSON, OF ALLEGHENY, PENNSYLVANIA, ASSIGNOR OF ONE-HALF TO C. H. CALVERT, OF ALLEGHENY, PENNSYLVANIA.

WATER COOLER AND FILTER.

SPECIFICATION forming part of Letters Patent No. 745,889, dated December 1, 1903.

Application filed June 17, 1903. Serial No. 161,770. (No model.)

*To all whom it may concern:*

Be it known that I, CHARLES E. MCPHERSON, a citizen of the United States of America, residing at Allegheny, in the county of Allegheny and State of Pennsylvania, have invented certain new and useful Improvements in Water Coolers and Filters, of which the following is a specification, reference being had therein to the accompanying drawings.

This invention relates to certain new and useful improvements in a water cooler and filter, and more particularly to that class of water coolers and filters which are adapted to be connected to a permanent supply of water.

The object of my invention is to provide a water-cooler in combination with a filter which will filter and cool the water as the same passes therethrough, means being provided whereby the filter may be readily cleansed when desired.

Another object of my invention is to provide a water cooler and filter which will occupy a small space and may be placed within any suitable casing, whereby the cooling means will be protected.

A still further object of my invention is to provide a water cooler and filter which will be extremely simple in construction, comparatively inexpensive to manufacture, and highly efficient in use.

Briefly described, my improved water cooler and filter comprises a filter-casing in which is located the filtering material, suitable water inlets and outlets being provided and connected to the outlets of the filter-casing. I provide a coil-pipe which is adapted to be located in the base of the casing in which the apparatus is located, and any desired means may be employed (preferably ice) for cooling the water as the same passes through the coil.

In describing the invention in detail reference is had to the accompanying drawings, forming a part of this specification, and wherein like numerals of reference indicate like parts throughout the several views, in which—

Figure 1:
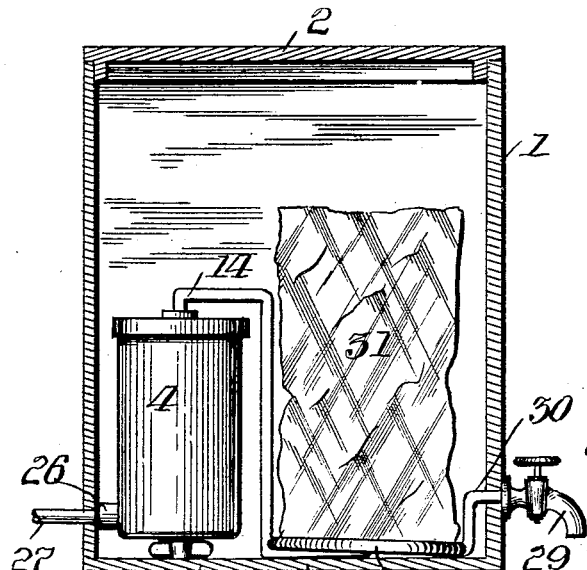
Figure 2:
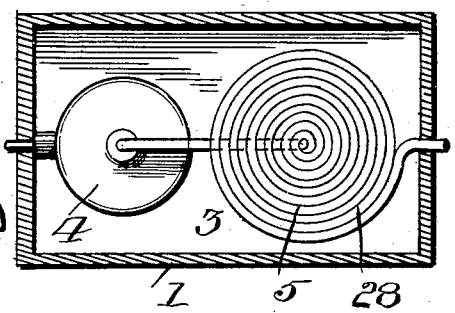
Figure 3:
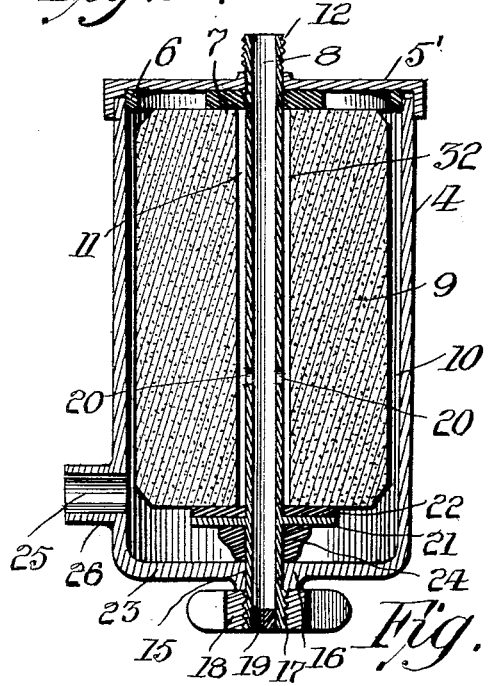
Figure 4:
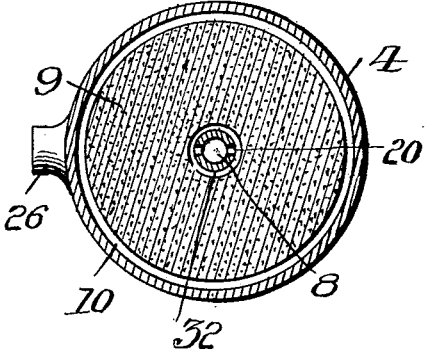

Figure 1 is a vertical sectional view of the casing, showing my improved filter and water-cooler located therein. Fig. 2 is a cross-sectional view of the casing, showing the filter and cooling-coil in top plan view. Fig. 3 is a vertical sectional view of the filter, and Fig. 4 is a horizontal sectional view of the same.

To put my invention into practice, I provide a suitable casing 1, having a lid or cover 2, and upon the base 3 of the casing is located the filter 4 and the cooling-coil 5. The filter comprises a casing 4, having a lid or cover 5', which is adapted to be secured upon the casing 4 by any suitable means, and upon the under face of the lid 5 I secure the rubber gaskets 6 and 7, the rubber gasket 6 adapted to fit snugly against the interior periphery of the annular casing 4, while the gasket 7 is adapted to fit the central pipe 8 snugly and also to brace and support the filtering material 9 within the casing 4. This filtering material is preferably cylindrical in form and of a smaller diameter than the casing 4, whereby an annular space 10 exists between the casing 4 and the filtering material 9. A central aperture 11 is provided centrally of the filtering material, through which passes the central pipe 8, the upper end of which is screw-threaded, as indicated at 12, to receive the pipe 14, leading to the cooling-coil 5, while the other end thereof is adapted to pass through an aperture 15, formed in the enlarged portion 16 of the casing 4, the end of which is screw-threaded, as indicated at 17, to receive the thumb-screw 18. The lower end of this pipe is closed, as indicated at 19, and intermediate of its length the apertures 20 are provided, the object of which will be hereinafter described. Formed integral with this pipe 8 or secured thereto is the annular flange or shoulder 21, upon which is adapted to be secured the annular rubber gasket 22, upon which rests the filtering material 9. Between this annular shoulder 21 and the base 23 of the filtering-casing 4 I provide a rubber gasket 24, the object of this gasket being to make a water-tight connection between the base 23 of the casing and the pipe 8. In the casing 4 I provide an aperture 25, formed in the boss 26, carried by the casing, and adapted to be secured upon this boss is the water-supply pipe 27.

The filtering material which I prefer to employ is formed of wood-pulp and pumicestone, which are thoroughly mixed together and formed into the desired shape in a mold provided therefor, when the mixture is then submitted to a pressure of five hundred pounds for twenty-four hours and then baked in an oven at a temperature of 1,700° for twenty minutes, thus providing a block of filtering material which will withstand any given pressure of water and readily filter the same when the water is properly fed to the material.

The cooling-coil 5, which is located upon the base 3 of the casing 1, is of spiral form, as indicated by numeral 28. The pipe 14 leads to the center of the coil, and a faucet 29 is adapted to be secured upon the end of the coil 30, which is adapted to project without the box, as shown in Fig. 1 of the drawings. Adapted to be located upon this coil is the cooling means, and I preferably employ a piece of ice, as indicated by reference-numeral 31, whereby the coil of pipe 5 will be in continual engagement with the ice, and the water passing therethrough will be readily cooled.

Upon the water entering the filter through the aperture 25 the pressure of the water will force the same to ooze through the filtering material into the central recess 32, from whence the filtered water passing through apertures 20 into the pipe 8, through the pipe 14, to the cooling-coil 5, to the faucet 29, from whence the same may be drawn.

It will be noted that I may make the filtering material of such a consistency as to retard the water passing therethrough, and the consistency of the material may be made whereby the same will withstand any given pressure used. It will also be noted that when the filtering material is made of a more compact nature than that heretofore described a higher pressure of water will be necessitated, whereby a continuous flow of filtered water will take place. When the filtering material is made coarser, a greater number of apertures similar to apertures 20 would have to be formed in the pipe 8, whereby the flow of filtered water passing into the recess 32 could be carried away to the cooling-coil as fast as the water is filtered.

While I have herein shown and described a practical embodiment of my invention, it will be obvious that various changes may be made in the details of construction without departing from the general spirit of my invention.

Having fully described my invention, what I claim as new, and desire to secure by Letters Patent, is—

1. A device of the character described, comprising a casing, a filter-casing mounted within the same, a water-supply pipe passing through the outer casing and communicating with the filter-casing near its bottom, a pipe leading from the top of said filter-casing downwardly to a point below the bottom of the same, a coil arranged on said pipe at or about the level of the bottom of the filter, a pipe leading from said coil through the wall of the outer casing and a faucet on said pipe, substantially as described.

2. In a device of the character described, comprising an outer casing and a filter-casing arranged in the same, said filter-casing having a water-inlet near its bottom extending through the outer casing, and a water-outlet at its top, a central pipe communicating with said water-inlet, and means for securing the filter-casing to the outer casing, of a cooling-coil arranged on the bottom of the outer casing, and a pipe leading from said coil through the outer casing and provided with a faucet, substantially as described.

In testimony whereof I affix my signature in the presence of two witnesses.

CHARLES E. McPHERSON.

Witnesses:
H. C. EVERT,
E. E. POTTER.